United States Patent [19]

Schneider et al.

[11] Patent Number: 5,041,709

[45] Date of Patent: Aug. 20, 1991

[54] ATTACHMENT DEVICE FOR ELECTRICAL DISCHARGE MACHINE

[76] Inventors: James R. Schneider, 34 Palmer Ave., Painesville, Ohio 44077; Don Duncan, 11468 Cherry Hollow Dr.; Eugene W. Petersen, 15550 Rock Creek Rd., both of Chardon, Ohio 44024; John R. Benadum, 227 Nelmar Dr., Painesville, Ohio 44077

[21] Appl. No.: 515,658

[22] Filed: Apr. 25, 1990

Related U.S. Application Data

[63] Continuation of Ser. No. 189,661, May 3, 1988, abandoned.

[51] Int. Cl.⁵ .............................. B23P 1/08; B23P 1/12
[52] U.S. Cl. ............................ 219/69.15; 219/69.14; 219/69.11
[58] Field of Search .............. 219/69.11, 69.15, 69.17, 219/69.14

[56] References Cited

U.S. PATENT DOCUMENTS

| 2,909,640 | 10/1959 | Fairbrother | 219/69 E |
| 3,427,423 | 2/1969 | O'Connor | 219/69 E |
| 3,629,540 | 12/1971 | Constance | 219/69 E |
| 3,816,693 | 6/1974 | Braun | 219/69 E |
| 4,230,926 | 10/1980 | Gaumond | 219/69 V |
| 4,441,004 | 4/1984 | Inoue | 219/69 E |

FOREIGN PATENT DOCUMENTS

| 0255322 | 12/1985 | Japan | 219/69 E |
| 0908195 | 10/1962 | United Kingdom | 219/69 E |

Primary Examiner—Mark H. Paschall
Attorney, Agent, or Firm—Watts, Hoffmann, Fisher & Heinke Co.

[57] ABSTRACT

The invention relates to the area of machine tools and more particularly relates to an attachment device for detachably mounting an electrode on an electrical discharge machine including a detachable head assembly incorporating an electric drive motor means for selectively rotating the electrode about its longitudinal axis relative to the workpiece.

1 Claim, 4 Drawing Sheets

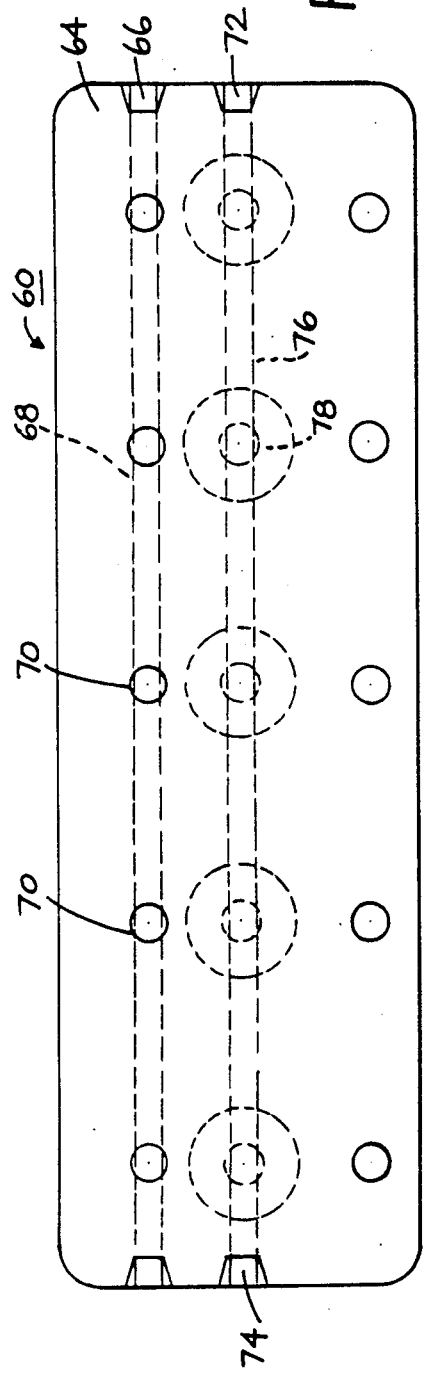
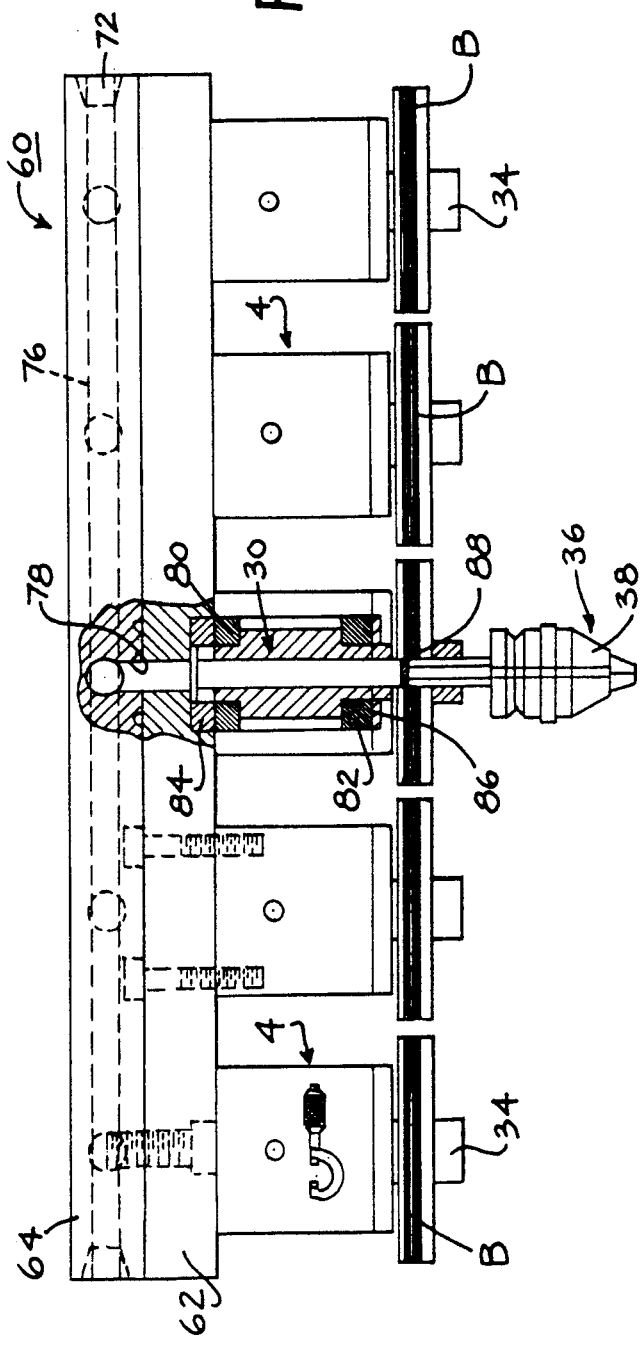

ATTACHMENT DEVICE FOR ELECTRICAL DISCHARGE MACHINE

This is a continuation of application Ser. No. 189,661, filed on May 3, 1988, now abandoned.

DESCRIPTION

1. Technical Field

This invention relates to the area of machine tools and more particularly relates to an attachment device for detachably mounting an electrode on an electrical discharge machine including a detachable head assembly incorporating an electric drive motor means for selectively rotating the electrode about its longitudinal axis relative to the workpiece.

2. Background of the Invention

The present invention relates to a new and novel attachment device that can be detachably mounted for use with an electrical discharge machine (EDM). In such machine the electrode, being consumable, is detachably mounted on the EDM machine for rotational movement about its longitudinal axis so as to remove metal from the workpiece, by fusion, so as to form apertures or holes in the workpiece as one would accomplish by conventional type drilling machines. EDM machining is a relatively recent technological innovation and greatly expedites the forming of apertures, cavities or holes in a metal workpiece particularly where relatively small size apertures, cavities or holes are required and with relatively close tolerances. It has been recognized that the consumable electrodes to accomplish the EDM machining operations are of a considerable expense and hence, have to be utilized with a maximum of machining efficiency. Heretofore, known attachment devices for rotatably mounting the electrodes have not been entirely satisfactory especially from a cost effective point of view. Also, such prior mounting devices have not been satisfactory in enabling the operator to maximize the use of the consumable electrode material so as to minimize the number of electrode pieces and hence, the cost of the electrode material for a given machining operation. In addition, such prior devices have not afforded a simple yet rugged attachment device that can be quickly and easily installed with a minimum of time and effort. Still further, prior attachment devices have not provided such a simple yet rugged attachment device that can quickly and easily chuck the electrode at not only a substantially reduced cost but also allowing efficient machining performance without the sacrifice of maintaining close machining tolerances.

Other advantages and objects of the present invention will become apparent as the following description proceeds when taken in conjunction with the accompanying drawings.

BRIEF DESCRIPTION OF THE DRAWINGS

FIG. 4 is a front elevation view illustrating a manifold assembly for mounting 5 spindles; and FIG. 5 is a top plan view of the manifold assembly of FIG. 4.

DESCRIPTION OF THE PREFERRED EMBODIMENTS

Figure 1:
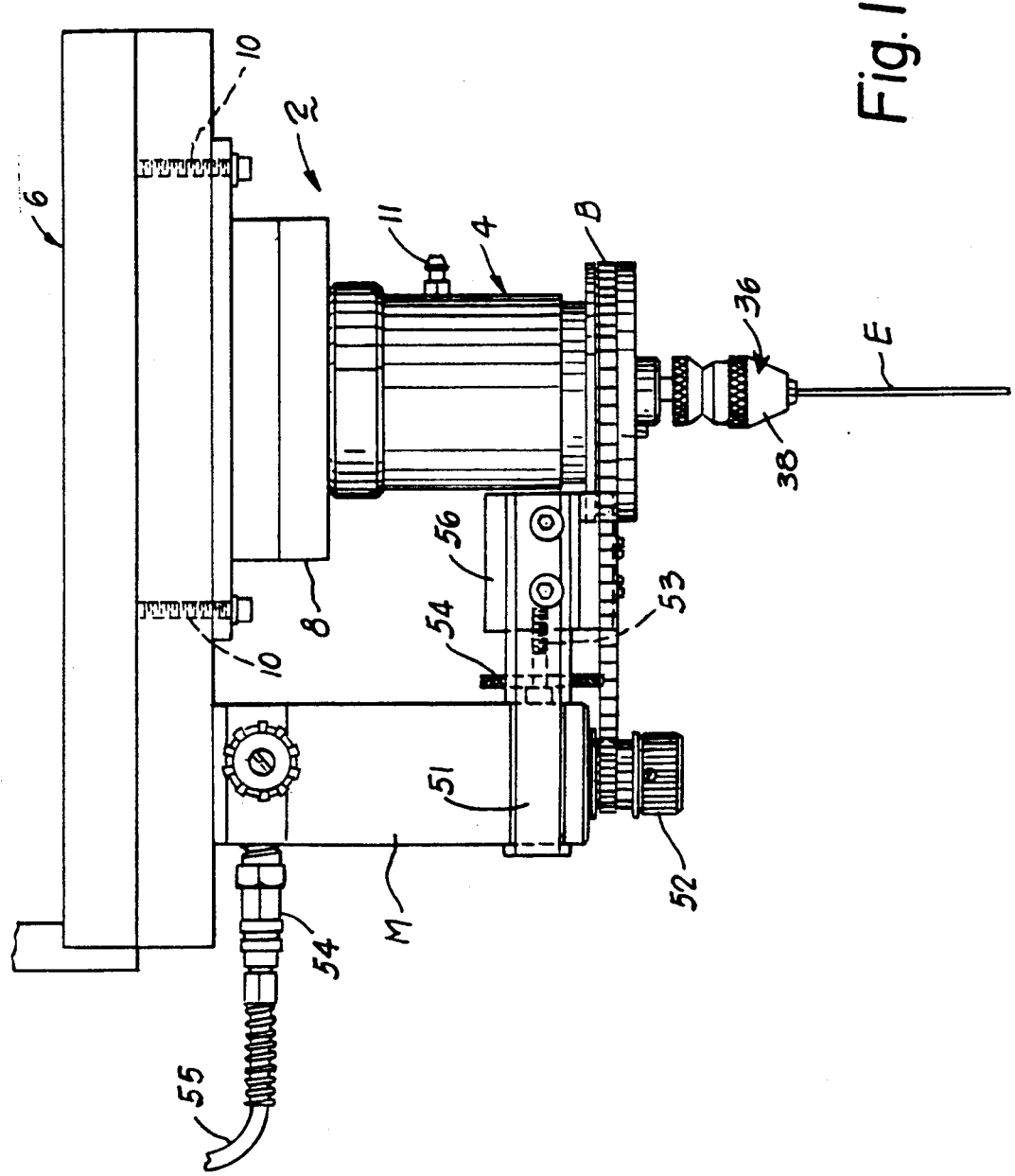
FIG. 1 is a front elevation view illustrating a typical electrical discharge machine and mounting the detachable attachment device of the present invention for holding an electrode for rotational movement relative to a workpiece.

Referring again to the drawings and in particular to FIG. 1 thereof, there is illustrated the attachment device, designated generally at 2, for attachment to an electrical discharge machine (EDM) for detachably mounting a consumable, hollow electrode E to a work spindle 36 which permits the electrode to be rotatably mounted onto the support platen, as at 6, of the machine.

The electrode spindle 36 extends from a cylindrical housing, as at 4, which housing is, in turn, detachably connected to the platen 6 via plates 8 and suitable fasteners, as at 10.

Figure 2:
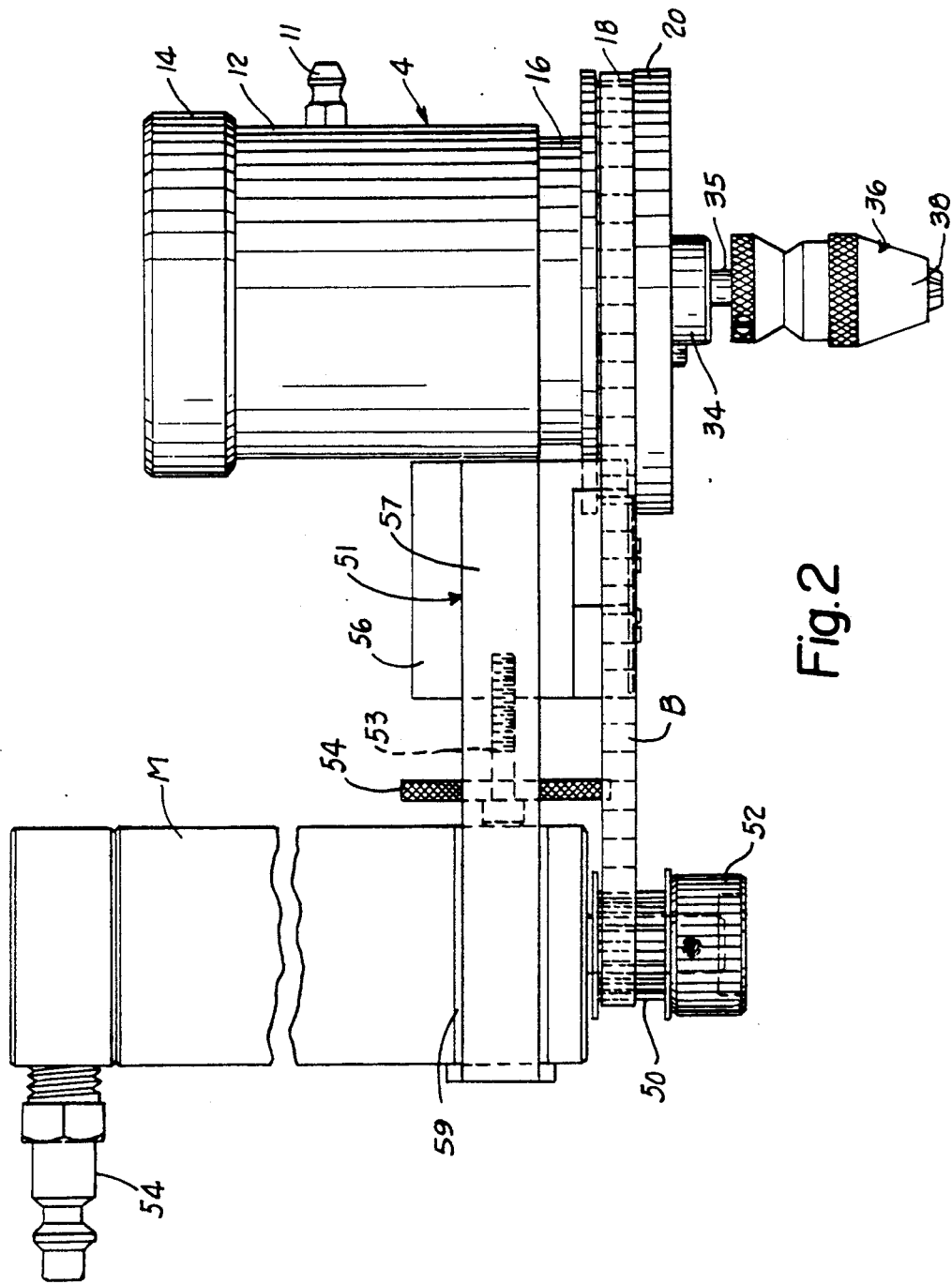
FIG. 2 is a side elevation view of the attachment device of the present invention removed from the electrical discharge machine.

As best illustrated in FIG. 2, the housing 4 includes a cylindrical body member 12 and an upper detachable cover 14 which is secured via screws 15. An inlet fitting 11 is provided to provide a suitable lubricant to the interior of the housing 4.

Figure 3:
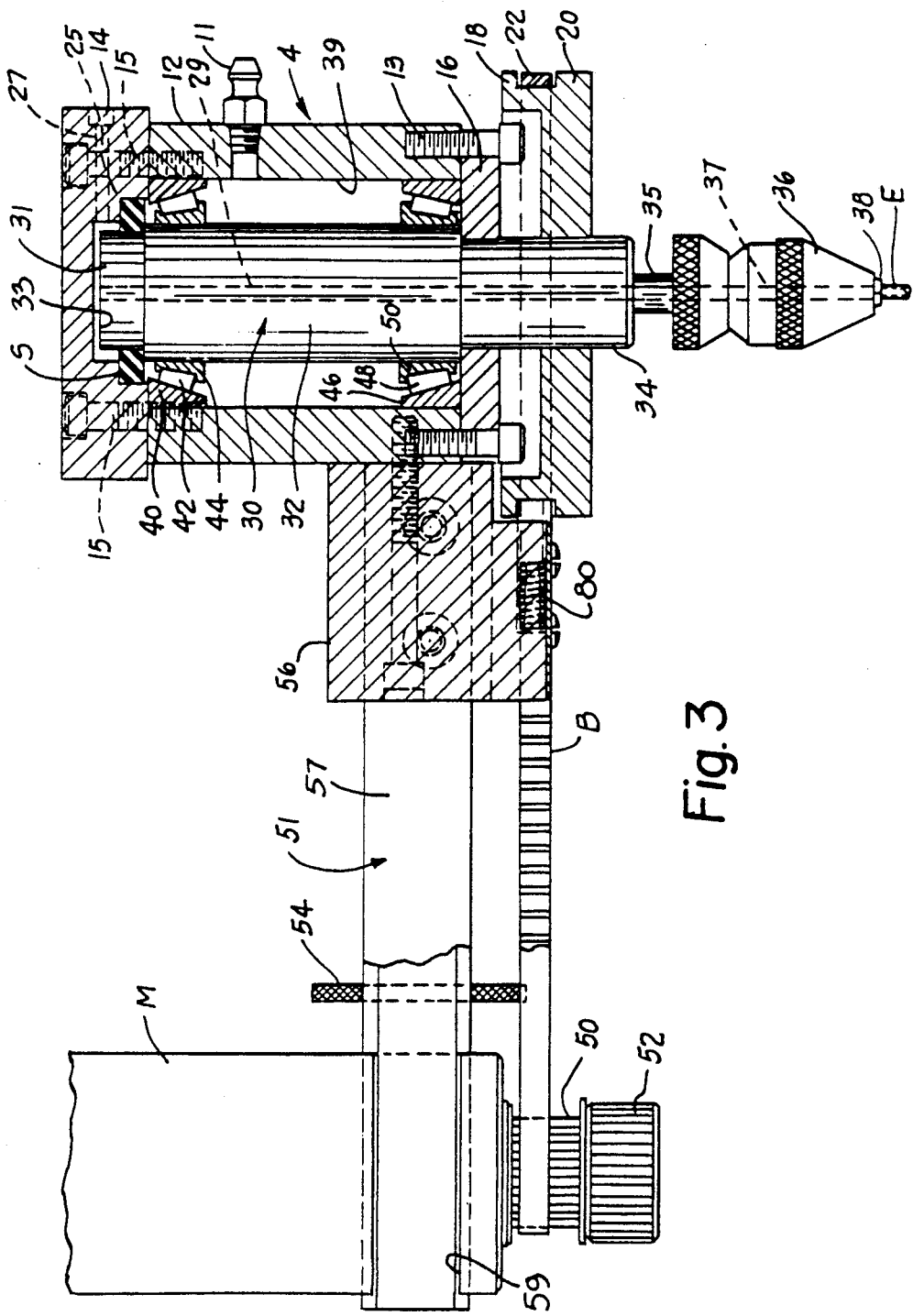
FIG. 3 is a fragmentary, side elevation view partly in section illustrating the attachment device of the present invention removed from the electrical discharge machine.

As best illustrated in FIG. 3, the spindle 36 includes a chuck 38 for holding the electrode with the spindle 36 being attached to a reduced diameter portion 34 of a spindle drive shaft 30 via a shank 35. The drive shaft 30 has an enlarged diameter section 32 which is journaled by roller bearings 42 and 48 which are supported in outer race members 40, 44, 46 and 50. A suitable bearing seal S is provided to provide a seal around a reduced diameter end portion 31 of the drive shaft 30.

In the invention, the drive shaft 30 and hence, spindle 36 are rotatably driven by a pneumatic motor M which is provided with suitable fittings 54 and 55 for connection to a suitable source of fluid pressure, as known in the art. The motor M is attached to the housing 4 by means of a mounting block 56 which is attached to the housing. The block 56 mounts a support bracket 51 which carries the motor M. An adjustment screw 53 and nut 54 are provided to give lateral adjustment of the motor relative to the housing and hence, to provide adjustment to the drive belt B which is trained around the reduced diameter portion 50 of a drive shaft 52 extending from the motor M. As best seen in FIG. 3, the drive belt B is trained around an annular drive collar 20, as at 22, such that the spindle shaft 30 is rotated about a vertical axis within the housing 4. Accordingly, upon actuation of the drive motor M rotational force is transmitted via the drive belt B to a drive collar 20 which is fixedly attached to the reduced diameter portion 34 of the spindle drive shaft 30.

As best illustrated in FIGS. 1, 2 and 3, the motor M may be slidably mounted on a pair of slide bars, as at 57, which fit within key-way slots 59 provided in the housing of the motor. Accordingly, by adjustment of the nut 54 via screw 53 the motor may be moved laterally toward and away from the spindle housing 4 thereby to provide the necessary tension on the drive belt B. Accordingly, the spindle housing 4 can be fixedly attached to the supporting structure of the EDM machine such that the drive motor is, in turn, supported by the slide bars 57 which are fixedly attached at one end to the block 56 which, in turn, support the brackets 51 which define the oppositely disposed pair of slide bars 57 with only one bar being illustrated in FIG. 2, for example.

In the invention and as best illustrated in FIG. 3, the spindle drive shaft 30 has a center flush system including an inlet port 25 and passageway 27 which communicate, as at 33, with a cavity 39 in the spindle cover 14. The cavity, in turn, communicates with a fluid center bore 29 which extends completely through the spindle shaft and through the detachable chuck 38. The chuck 38 detachably holds the electrode E which is of a hollow construction having a central bore, as at 37, which communicates with the center bore 29 to provide a continuous passageway to accommodate the flushing action. With a rotating electrode, the center flow-through flushing acts to produce a true, round hole and results in better particle flushing with a more uniform electrode wear together with a faster rate of hole production, as compared to non-rotating or non-flushing applications.

Referring now to FIGS. 4 and 5, there is illustrated a multi-spindle arrangement, designated generally at 60, which provides a universal mounting arrangement in the form of a manifold to enable multiple spindles to be utilized in a side-by-side relationship, and for use with conventional ram EDM equipment. For example, with three or less spindles on a machine, a typical 3R-6-EX7 electro-magnetic chuck can be utilized instead of the universal plate, as desired. The manifold construction of the present invention can be utilized in place of individual plates for mounting, for example, up to five spindles, as desired.

As shown, a plurality of spindle housings, as at 4, may be detachably mounted to a lower manifold plate 62 which may be made of a polymeric (plastic) material which, in turn, may be fixedly attached to an upper manifold plate 64 which may be made of a suitable metallic material, such as aluminum or the like. The upper manifold plate 64 is provided with an inlet port, as at 66, to provide ingress of pneumatic pressure via passageway 68 and port 70 to provide a suitable supply of pneumatic pressure to the pneumatic motors for driving the belts B. Also, a pair of inlet ports 72 and 74 may communicate with passageway 76 and bores, as at 78, to provide a flow-through fluid flushing action to and through the hollow electrode, as aforesaid.

As best seen at FIG. 4, each cylinder housing 4 includes the drive shaft 30 which has a bearing, as at 80 and 82 at its upper and lower ends and resilient seals, as at 84 and 86, made of a plastic or rubber material in conjunction with a further seal, as at 88, to make certain that there is no fluid leakage between the movable and stationary component parts.

In the invention, it is important to note that each spindle is electrically isolated from an adjacent spindle wherein electric power may be applied to the drive plate or collar 20 (FIG. 3) which may be made of a conductor material, such as brass or the like. Electric power may be provided to the drive collar via electric brushes 80 in a manner as known in the art.

By the foregoing arrangement and construction, there is provided a small, compact design for the attachment device which can be easily and quickly installed with a minimum of time and effort. Specifically, it has been found that there is provided 20% more usable electrode length which electrodes can be easily and quickly set. Importantly, the attachment device is of a rugged and reliable construction which can be produced at an affordable price and which has low maintenance and rebuild cost and hence, less down time. Also, the attachment device can be readily used one at a time or in series, as desired.

In the invention, the pneumatic spindle device is constructed and arranged for ready attachment to an EDM machine and is of a compact yet rugged construction which enables a full 12 inch electrode to be utilized. Because of the compact size of the pneumatic spindle whether in a single or multiple configuration, maximum production can be accomplished. Accordingly, it has been found that up to five units mounted on the same machine provide all the advantages of variable speed, rotating electrodes, flush-thru and even wearing electrodes, all of which enable a steady rate of production with minimum interruption.

These and other advantages and objects of the present invention will be recognized when considered in reference to the accompanying drawings and the claims appended hereto.

What is claimed is:

1. A pneumatic spindle attachment for detachable connection to a support structure of an electrical discharge machine for rotatably mounting a plurality of hollow consumable electrodes comprising:

a plurality of independent pneumatic spindle devices, each comprising:
  a spindle housing having an inner cavity and an air inlet port for pressurizing the cavity;
  a hollow, rotatable drive shaft vertically mounted within said housing, the drive shaft having a collar member fixed thereto;
  a pneumatic drive motor for rotating the drive shaft about a vertical axis, the dive motor having an air inlet for communication with a pressurized air supply;
  a chuck for detachably connecting one of the hollow, consumable electrodes to said drive shaft;
  a bracket assembly connected to said spindle housing for movably mounting the pneumatic drive motor relative to said spindle housing;
  drive belt means operably connected between said drive motor and the collar member for rotating the shaft about its axis;
  electric power means for providing electric power to the collar member from a source of power;
  wherein the hollow drive shaft and the hollow electrode form an uninterrupted fluid passageway for communicating with the cavity and for delivering air to and through the electrode for flushing particles therefrom; and, a manifold means for connecting the pneumatic spindle devices to the support structure of the electrical discharge machine and for electrically insulating the spindle devices from one another, the manifold means comprising:
  a support plate having first and second separate air supply passages formed therein wherein said first air supply passage communicates with each of the inlets of the pneumatic drive motors such that the pneumatic drive motors all receive substantially equal air pressure and wherein the second air supply passage communicates with each of the spindle housing air inlet ports such that each of the cavities are substantially equally pressurized; and
  an electrically insulating plate defining a horizontal surface, wherein each spindle device is independently mounted to the surface and is electrically insulated from the other spindle devices.

* * * * *